S. E. BUCK.
HEATING AND FEEDING APPARATUS FOR FEED WATER PURIFYING COMPOUNDS.
APPLICATION FILED NOV. 11, 1912.
1,063,116.
Patented May 27, 1913.
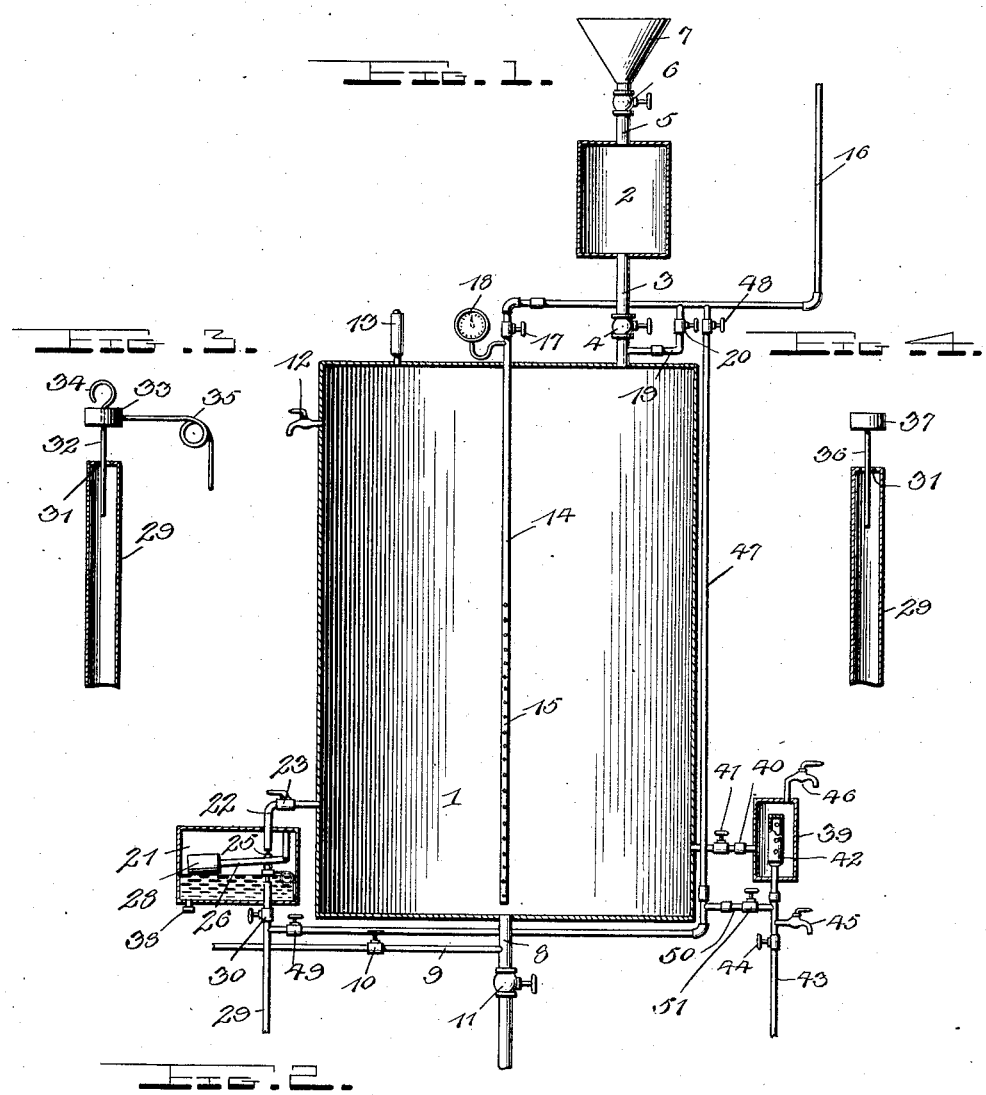
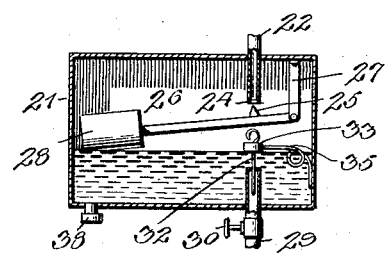

UNITED STATES PATENT OFFICE.

STEPHEN EDWARD BUCK, OF MOLINE, ILLINOIS.

HEATING AND FEEDING APPARATUS FOR FEED-WATER-PURIFYING COMPOUNDS.

1,063,116.      Specification of Letters Patent.      Patented May 27, 1913.

Application filed November 11, 1912. Serial No. 730,682.

*To all whom it may concern:*

Be it known that I, STEPHEN EDWARD BUCK, a citizen of the United States, residing at Moline, in the county of Rock Island and State of Illinois, have invented certain new and useful Improvements in Heating and Feeding Apparatus for Feed-Water-Purifying Compounds; and I do declare the following to be a full, clear, and exact description of the invention, such as will enable others skilled in the art to which it appertains to make and use the same.

This invention relates to improvements in heating and feeding mechanism for feed water purifying compounds.

One object of the invention is to provide an apparatus of this character having an improved construction and arrangement of heating and mixing tank and means for supplying the purifying chemicals thereto without stopping or interfering with the operation of the tank.

Another object is to provide an improved means for controlling and regulating the discharge of the purifying compound from the tank to the feed water of the boiler.

With these and other objects in view, the invention consists of certain novel features of construction, and the combination and arrangement of parts as will be more fully described and claimed.

In the accompanying drawings, Figure 1 is a vertical sectional view of my improved compound mixing tank and feeding mechanism; Fig. 2 is an enlarged vertical sectional view of one form of the automatic discharging mechanism for the tank; Fig. 3 is an enlarged sectional view of the inner end of the suction pipe of the feeding mechanism shown in Fig. 2 and illustrating one form of cleaning rod for this pipe; Fig. 4 is a similar view showing a modified form of cleaning rod.

In the embodiment of my invention, I provide a mixing tank 1, which may be of any size and shape and which is closed and has connected thereto a chemical feeding tank 2. The tank 2 is connected to the upper end of the mixing tank 1 by a pipe 3 in which is arranged a cut off valve 4. Connected with the top of the tank 2 is a feed pipe 5 having a cut off valve 6 and a funnel 7. By providing a chemical feeding tank 2 and the valved pipes connected thereto as herein shown and described it will be seen that chemical may be supplied to the mixing tank 1 without releasing the pressure therein or interfering with the operation thereof. In feeding the chemicals to the tank 1 through the medium of the tank 2 the valve 4 in the pipe 3 is first closed after which the valve 6 in the feed pipe 5 is opened and the chemicals placed in the funnel 7 and discharged therefrom into the tank 2. After the tank 2 has thus been filled the valve 6 is closed and the valve 4 in the pipe 3 is opened thus permitting the chemicals in the tank 2 to enter the tank 1.

Connected with the bottom of the tank 1 is a combined water inlet and washout pipe 8 to which is connected a main water supply pipe 9 having therein a cut off valve 10. In the pipe 8 below the connection of the pipe 9 is the washout valve 11 which is open only when it is desired to clean or flush out the tank 1. In the upper portion of the tank 1 is arranged a gage cock 12 whereby it may be determined when the water in the tank has reached the level at which the cock is placed and which is the proper quantity of water to be placed in the tank for receiving the chemicals which when mixed therewith form the purifying compound. In the top of the tank is arranged a safety valve 13 whereby danger of over pressure in the tank 1 is obviated.

Arranged in the tank 1 and depending therein to a point near its lower end is a steam discharge pipe 14 the lower portion of which is perforated at 15 for the discharge of steam. The upper end of the discharge pipe 14 is connected to a steam supply pipe 16. In the upper portion of the discharge pipe 14 above the tank 1 is a cut off valve 17 and connected to the pipe below the valve 17 is a pressure gage 18 whereby the pressure of steam discharged into the tank 1 is indicated. By discharging steam into the tank 1 in the manner described the chemicals will be thoroughly mixed with the water therein to form the purifying compound which will be thoroughly heated and cooked by the steam. The steam when thus admitted to the tank also produces a pressure therein which if desired may be permitted to increase to such an extent as to serve as the means for forcing the compound out of the tank as will be hereinafter more fully described. The steam supply pipe 16 is connected by a branch pipe 19 to the chemical feed pipe 3 whereby steam is admitted to the lower portion of the feed pipe and through the latter passes into the upper portion of the mixing tank for creating a pressure on the compound therein. The admission of steam to the feed pipe 3 also breaks up or cuts the chemicals as they are discharged through the pipe 3 into the tank 1 thereby facilitating the mixing of the chemicals with the solution in said tank. In the pipe 19 is arranged a steam controlling valve 20 whereby the steam passing through said pipe is cut off or controlled.

In connection with the tank 1 I provide a suction feeding mechanism and a pressure feeding mechanism either of which may be employed for feeding the compound from the tank 1 to the feed water before the same passes to the boiler. The suction feeding mechanism comprises a closed tank 21 to which is connected a discharge pipe 22 from the lower portion of the compound mixing and heating tank and in which is located a controlling valve 23. The lower end of the pipe 22 extends a suitable distance into the tank 21 and in the lower end of said pipe 22 is a tapered valve seat 24 with which is adapted to be engaged a valve 25 arranged on a float actuated valve operating lever 26 one end of which is pivotally connected to a bracket 27 depending from the top of the tank 21 and on the outer or free end of which is a float 28 which is adapted to be raised and lowered by the rise and fall of the compound in the tank 21 thereby actuating the lever 26 and opening and closing the valve 27 whereby a uniform quantity of compound is constantly and automatically maintained in the tank 21.

Connected with the lower portion of the tank 21 is a suction pipe 29 the upper end of which projects a suitable distance into the tank 21 as shown. The opposite end of the pipe 29 is connected to any form of suction pump (not shown) but by means of which the solution or purifying compound is pumped from the suction tank 21 and discharged into the feed water of the boiler. In the pipe 29 is arranged a cut off valve 30 whereby the pipe is closed when desired. The end of the pipe which projects into the tank 21 is reduced or has formed therein a fluid inlet passage 31 of considerably less diameter than the inside diameter of the pipe and engaged with said aperture is a rod 32 the upper end of which is engaged with a block 33 and has formed thereon above the block an eye 34.

The block 33 is connected to one end of spring 35 the opposite end of which is suitably secured to the inner side or end of the adjacent end of the tank as shown. By providing the rod 32 and supporting the same in the manner described it will be seen that the suction of the pump through the pipe 29 against the block 33 will cause the latter and the rod 32 to dance up and down, which action of the rod will keep the passage 31 in the pipe 29 clean and free from obstructions. By providing larger or smaller rods 32 the size of the aperture 31 may be regulated to permit more or less of the solution to flow from the tank into the pipe 29.

In Fig. 4 of the drawings is shown a slightly modified construction and arrangement of cleaning rod 36 for the aperture in the upper end of the pipe 29. In this instance the rod 36 is secured at its upper end in a float 37 which will rise to the top of the solution in the tank 21 between the strokes of the pump and will be pulled down on each suction stroke thereby agitating or causing the rod 36 to dance up and down in the pipe 29, thus keeping the aperture 31 clean. By providing the float operated valve 25 for the discharge pipe 22 of the tank it will be seen that while the solution is being drawn from the tank from the pump, the float will drop, thus opening the valve and permitting the compound from the tank 1 to flow into the suction tank. As soon as the pump is stopped the accumulation of the solution or compound in the tank 21 will raise the float 28 and lever 26 and will thereby automatically close the valve 25 which will prevent the further discharge of the compound into the tank 21 until the pump is again started. In the bottom of the tank 21 is arranged a cleanout opening which is normally closed by a plug or cap 38 as shown. The pressure feeding mechanism for the tank 1 comprises a feed tank 39 of suitable size and which is connected by a discharge pipe 40 with the lower portion of the tank 1 as shown. In the discharge pipe 40 is arranged a cut off valve 41 whereby the pressure feeding mechanism may be cut off from the tank 1 when desired. In the tank 39 is arranged a perforated feeding cylinder 42 to the lower end of which is connected a feed pipe 43 through which the compound is conducted to and discharged into the feed water of the boiler. In the pipe 43 is arranged a cut off valve 44 and a blow off cock 45 while in the upper end of the tank 39 is arranged a blow off cock 46.

By constructing and arranging the pressure feeding mechanism as herein shown and described it will be seen that when the valve 41 in the discharge pipe 40 and the valve 44 in the feed pipe 43 are opened and the blow off cocks 45 and 46 are closed that the steam in the tank 1 when reaching the proper pressure will force the compound from the tank 1 into the feed tank 39 from whence it will pass through the perforated cylinder 42 into the feed pipe 43 and will be conducted thereby to the feed water.

The steam supply pipe 16 is connected by a branch pipe 47 to the suction pipe 29 whereby steam may be admitted to said pipe 29 for the purpose of blowing out and cleaning the latter. In the branch steam pipe 41 near its connection with the main pipe 16 is a cut off valve 48 while a similar valve 49 is arranged in the opposite end of the branch pipe adjacent to its connection with the suction pipe 29 whereby the passage of the steam through the branch pipe 47 is controlled. The branch steam pipe 47 is connected by a short branch pipe 50 to the feed pipe 43 of the pressure feeding mechanism above the lower blow-off 45 whereby when desired the valves 41 and 44 may be closed and the blow-off cocks 45 and 46 opened thereby discharging steam into the upper end of the feed pipe 43, perforated cylinder 42 and feed tank 39 for the purpose of blowing out and cleaning these parts. The branch steam pipe 50 is provided with a cut off valve 51 whereby the passage of steam to the feeding mechanism is controlled.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. A heating and feeding apparatus for feed water purifying compounds comprising a mixing and cooking tank adapted to receive the compound, means whereby steam is introduced into said tank for the purpose of heating and cooking the compound, a closed tank, a valved discharging pipe connecting the last-named tank with the lower portion of said heating tank, a float operated valve in said closed tank to control the discharge of the compound from the heating tank, a valved suction pipe connected with said closed tank whereby the liquid may be pumped from the latter, said pipe having a reduced inner end, a feed controlling and cleaning rod loosely engaged with the reduced inner end of said suction pipe, and means to loosely support said rod whereby the suction through the pipe will keep the rod agitated and the opening in the end of the pipe free from obstruction.

2. A heating and feeding apparatus for feed water purifying compounds comprising a mixing and cooking tank adapted to receive the compound, means whereby steam is introduced into said tank for the purpose of heating and cooking the compound, a closed tank, a valved discharging pipe to connect it with the lower portion of said heating tank, a valved operating lever, a valve on said lever adapted to be brought into engagement with the end of said discharge pipe whereby the latter is closed, a float on said lever, a suction pipe having its end projecting into said closed tank and reduced, a cleaning and regulating rod loosely engaged with the reduced end of said pipe, a block on the outer end of said rod, a spring whereby said rod is yieldingly supported, a cut off valve arranged in said suction pipe, and a steam conducting pipe connected with the latter whereby steam may be introduced thereinto for the purpose of cleaning and blowing out the same.

3. A heating and feeding apparatus for feed water purifying compounds comprising a closed tank, a combined washout and water inlet pipe connected with the bottom of the tank, a valve to close said pipe, a steam discharge pipe arranged in said tank and having a perforated inner end, a steam supply pipe connected with said discharge pipe, a valve arranged in said discharge pipe, a branch steam pipe to connect said steam supply pipe with the upper portion of the tank, a valve in said branch pipe, a feeding mechanism connected to the lower portion of said tank whereby the compound may be fed to the feed water, and a valved branch steam pipe connecting said steam supply pipe with said feeding mechanism.

4. In a device of the class described, the combination with a closed tank, an outlet pipe rising through the bottom thereof, and an inlet pipe; of a block yieldably supported above the end of said outlet pipe, means for creating suction in the latter, and a rod carried by the block and depending loosely into said pipe.

5. In a device of the class described, the combination with a closed tank, an outlet pipe rising through the bottom thereof, and an inlet pipe; of a spring supported within said tank, a block yieldingly carried by one end of said spring and standing over the inner end of the outlet pipe, means for creating suction through the latter, and a rod whose lower end stands within said pipe, whose body passes through said block, and whose upper end has an eye.

6. In a device of the closs described, the combination with a closed tank, an outlet pipe rising through the bottom thereof, and an inlet pipe; of a closure for the inner end of said outlet pipe, which closure has a passage smaller than the bore of this pipe, means for creating suction through the latter, and a yieldingly supported rod depending loosely through said passage.

In testimony whereof I have hereunto set my hand in presence of two subscribing witnesses.

STEPHEN EDWARD BUCK.

Witnesses:
 THEODORE M. WHEELOCK,
 CHARLES AKERS.

Copies of this patent may be obtained for five cents each, by addressing the "Commissioner of Patents, Washington, D. C."